Aug. 19, 1958 P. TALMEY 2,848,359

METHODS OF MAKING PRINTED ELECTRIC CIRCUITS

Filed June 20, 1955

INVENTOR.
Paul Talmey

BY

Smith, Olsen, Baird & Miller,
Attys.

United States Patent Office 2,848,359
Patented Aug. 19, 1958

2,848,359

METHODS OF MAKING PRINTED ELECTRIC CIRCUITS

Paul Talmey, Barrington, Ill., assignor to General American Transportation Corporation, Chicago, Ill., a corporation of New York Application June 20, 1955, Serial No. 516,548

13 Claims. (Cl. 117—212)

The present invention relates to methods of making printed electric circuits, and more particularly to improved methods of the character disclosed in the copending application of Warren G. Lee, Serial No. 500,641, filed April 11, 1955.

It is a general object of the invention to provide a method of making a printed electric circuit comprising an insulating base carrying both electrically conducting circuit elements and an insulating layer, wherein the insulating layer cooperates with the insulating base completely to channelize the conducting circuit elements.

Another object of the invention is to provide a method of making a printed electric circuit of the character described, wherein the insulating layer mentioned is initially employed in masking the insulating base to define the configuration of the conducting circuit elements in forming the same, and wherein this layer is ultimately employed together with the insulating base in channelizing the conducting circuit elements in protecting the same in use.

Another object of the invention is to provide an improved method of making a printed electric circuit of the character described, wherein the insulating layer mentioned is subsequently employed in the complete potting of the conducting circuit elements so as to seal them against air and moisture in use.

A further object of the invention is to provide an improved method of making a printed electric circuit that involves electrically conducting circuit elements that are chemically deposited upon an insulating supporting base, wherein the circuit element consists essentially of nickel and phosphorus.

Further features of the invention pertain to the particular arrangement of the steps of the method of making the printed electric circuit, whereby the above-outlined and additional operating features thereof are attained.

The invention, both as to its organization and method of operation, together with further objects and advantages thereof, will best be understood by reference to the following specification taken in connection with the accompanying drawing, in which.

Figure 3:
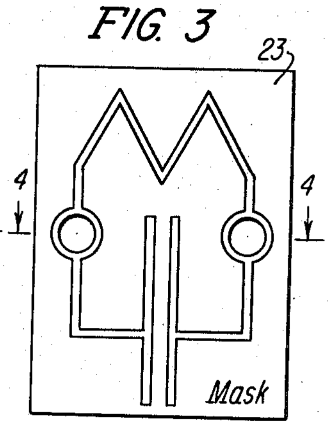
Fig. 3 is a plan view of the board of Fig. 1 carrying an insulating masking layer upon the upper surface thereof, the masking layer having openings therethrough depicting the outlines of a resistor and a capacitor connected between a pair of terminals respectively surrounding the pair of holes mentioned.
Figure 5:
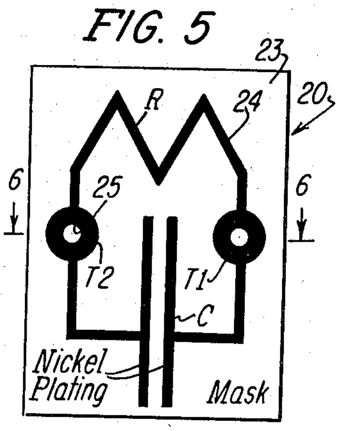
Figure 6:
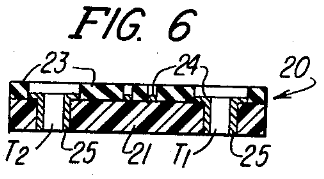

Fig. 5 is a plan view of the finished printed electric circuit that has been made in accordance with the method of the present invention, and including the board of Fig. 3, after a nickel-phosphorus layer has been chemically plated thereon and through the openings in the insulating masking layer so as fully to define the pair of terminals respectively in the pair of holes mentioned, as well as the resistor and the capacitor connected in parallel relation between the pair of terminals and supported upon the upper surface of the board;

Fig. 6 is a vertical sectional view of the printed electric circuit, taken in the direction of the arows along the line 6—6 in Fig. 5.

Figure 7:
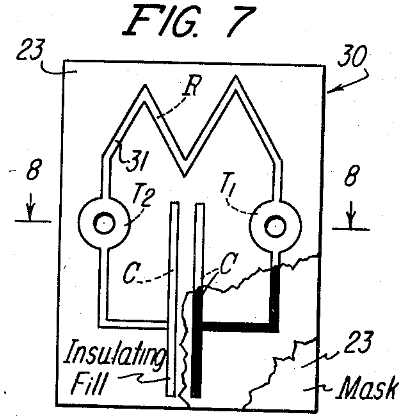
Figure 9:
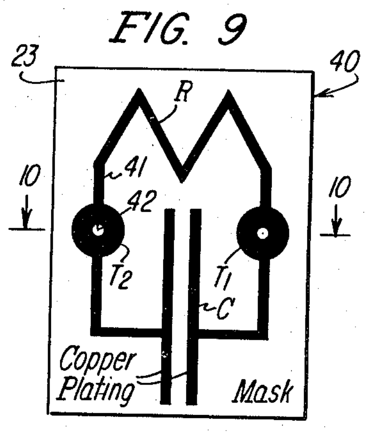
Figure 8:
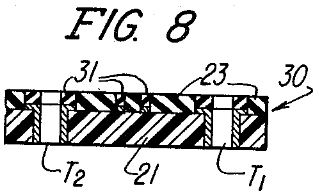
Figure 10:
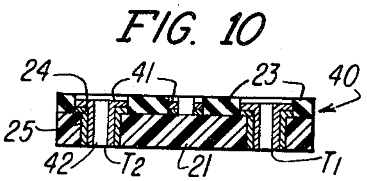

Fig. 7 is a plan view, partly broken away, of a modified form of the printed electric circuit;

Fig. 8 is a vertical sectional view of the printed electric circuit, taken in the direction of the arrows along the line 8—8 in Fig. 7;

Fig. 9 is a plan view of another modified form of the printed electric circuit; and Fig. 10 is a vertical sectional view of the printed electric circuit, taken in the direction of the arrows along the line 10—10 in Fig. 9.

In Figs. 2, 4, 6, 8 and 10, the thickness of the board, the layers, etc., have been greatly exaggerated and in Figs. 3, 5, 7 and 9, the thicknesses of the outlines of the resistor and the capacitor have been greatly exaggerated; these exaggerated dimensions being so employed for the purpose of better illustration.

Referring now to the drawings, the construction and arrangement of the printed electric circuit will best be understood from the following description of the method of making the same; however, it is noted that the finished printed electric circuit 20 is shown in Figs. 5 and 6 as comprising an insulating board or base 21 carrying on the front or upper surface thereof a printed electric circuit consisting of a resistor R and a capacitor C connected in parallel relation between a pair of terminals T1 and T2. The parallel connection of the circuit element R and C has no particular significance, it being employed entirely for purpose of description and the circuit elements that are normally carried upon the lower or rear surface of the insulating board 21 are omitted in the interest of simplicity of disclosure, since the present invention is directed to the structure of the printed electric circuit and the method of making the same, as contrasted with the composition of the printed electric circuit as employed ultimately in an electric device, such as a radio set, a television set, an electric control panel, etc.

Figure 1:
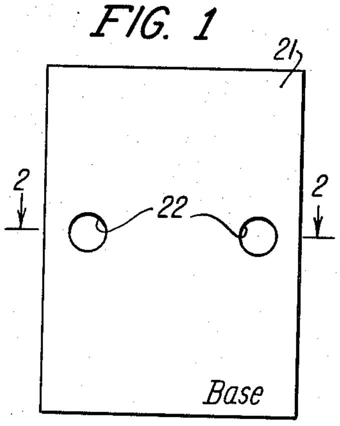
Figure 1 is a plan view of a sheet of insulating board after it has been sheared and a pair of holes have been pierced therethrough, and comprising the supporting element of a printed electric circuit.
Figure 2:
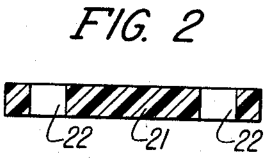
Fig. 2 is a vertical sectional view of the board, taken in the direction of the arrows along the line 2—2 in Fig. 1.

Turning now to the method of making the printed electric circuit 20 and referring to Figs. 1 and 2, first there is provided a sheared and pierced insulating board 21 that may have a thickness in the general range 50 to 125 mils and that may comprise a lamina in the form of a paper, textile, etc., reinforced thermoset resin, such, for instance, as phenol-formaldehyde condensation products. As illustrated, the board 21 is of substantially rectangular form and has a pair of spaced-apart holes 22 pierced therethrough, the board 21 having an appropriate thickness for purpose of support.

The front surface of the board 21 and the surfaces thereof surrounding the holes 22 therein are then prepared by a freshening step; which step may involve sanding, blasting, brushing, grinding, buffing, abrading, chemical etching, etc., so as to remove the "outer skin" thereof in order to enhance the absorption capacity of the surfaces noted by mechanically breaking previously existing bonds. This step produces the required surface-roughening and removal of the outside resin film from the surfaces mentioned of the board 21. Specifically, "vapor blasting" of these surfaces of the board 21 may be employed; and thereafter the board 21 is rinsed in tap water for about 5 minutes at about 60° C. Then the surfaces mentioned of the board 21 are subjected to a vapor degreasing step; and then cleaned, for instance in a "Tysol No. 36" solution, this solution comprising an aqueous solution containing about 4 to 6 oz. of "Tysol" (a mildly alkaline detergent) per gallon of water. Again the board 21 is rinsed in tap water for about 5 minutes at about 60° C. Then the surfaces mentioned of the board 21 are acidified in an aqueous solution containing 10–20% sulfuric acid for a short time interval of about 1 to 5 minutes. Again the board 21 is rinsed as before; and next, the surfaces mentioned of the board 21 are activated in an aqueous palladium chloride solution containing about 1000 p. p. m. of $Pd^{++}$ for a time interval of about 15 to 20 minutes. This aqueous solution may contain palladium chloride in an amount of about 1.66 gms./liter. The board 21 is then dried in an oven, or with infra-red radiation, at about 80° C. for a short time interval. Next, the board 21 is immersed in a reducing solution, such, for example, as an aqueous solution containing about 0.15 m. p. l. of sodium hypophosphite or hypophosphorous acid, the immersion time being about 2 minutes. The board 21 is rinsed in tap water for about 15-seconds, and then again dried in an oven, or with infra-red radiation, at about 80° C. for a short time interval.

Next, an insulating masking layer 23 is laid down upon the freshened and acidified front surface of the board 21, employing a conventional silk screen technique and utilizing a thermosetting composition. Specifically, a silk screen masking lacquer is employed that is water-insoluble and that may comprise a mixture of silicone and the usual ingredients that are productive upon curing of a synthetic organic resin, such, for example, as phenol-formaldehyde condensation products, the ingredients of the resin being uncured when laid down upon the front surface of the board 21. Specifically, the insulating masking layer 23 is laid down through the silk screen so as to define or depict upon the front surface of the board 21, the outlines of the electrically conducting circuit elements of the finished printed electric circuit 20. By way of illustration, the insulating masking layer 23 depicts the outlines of the resistor R and the capacitor C in parallel circuit relationship between the pair of terminals T1 and T2, as shown in Figs. 3 and 4.

Figure 4:
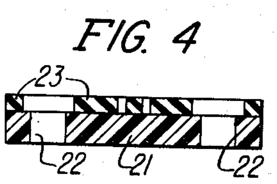
Fig. 4 is a vertical sectional view of the board, taken in the direction of the arrows along the line 4—4 in Fig. 3.

After the insulating masking layer 23 has been laid down upon the previously prepared front surface of the board 21, employing the conventional silk screen technique noted, the board 21 is subjected to heat-treatment in an oven at a temperature of about 325° F. for a time interval of about 30 minutes in order to react the ingredients of the lacquer of the insulating masking layer 23, so as to effect thermosetting and curing of the resulting synthetic organic resin, whereby the insulating masking layer 23 is, at this time, a smooth hard film intimately bonded to the upper surface of the board 21, as shown in Figs. 3 and 4. Specifically, the insulating masking layer 23 may essentially comprise silicone and/or phenol-formaldehyde condensation products and may have a thickness in the general range 0.5 to 2.0 mils; whereby the thickness of the insulating masking layer 23 is substantially less than that of the board 21.

As illustrated in Figs. 3 and 4, the outlines of the resistor R, the capacitor C and the terminals T1 and T2, are defined by corresponding elongated channels or grooves formed in the insulating masking layer 23 and commensurate with the thickness thereof so that, at this time, only the corresponding previously activated primary areas of the front surface of the board 21 are exposed through these channels or grooves, together with the activated surfaces of the board 21 surrounding the holes 22. Thus, the unmasked primary areas mentioned define the pattern of the desired conductive circuit elements, while the contiguous masked secondary areas define the background of the conductive circuit elements mentioned.

Next, the board 21 is immersed in an aqueous nickel strike bath at room tempertaure (about 70° F.) for about 10–20 minutes; and at this point, it is noted that the rinsing of the board 21 (preceding the application of the insulating masking layer 23 thereto followed by heat-treatment and resulting curing of the layer 23) and preceding the immersion thereof in the aqueous nickel strike bath is very important as it prevents decomposition of the nickel strike bath by the carrying over with the board 21 of adsorbed $Pd^{++}$ ions. Preferably, the nickel strike bath that is employed is of the character of that disclosed in the previously-mentioned Lee application and has the approximate composition:

| Ingredient | m. p. l. | gm./l. |
|---|---|---|
| Nickel hypophosphite | 0.09 | 26.7 |
| Ortho-boric acid | 0.02 | 1.2 |
| Ammonium sulfate | 0.02 | 2.64 |
| Sodium acetate | 0.06 | 4.92 |

The pH of this nickel strike bath is adjusted within the approximate range 5.5 to 6.0 prior to use, sulfuric acid or sodium hydroxide being employed, as required. The plating rate of this nickel strike bath is about 0.04 mil/hr.

Next, the board 21 is rinsed in tap water and is then pickled in sulfuric acid (10%) for about 30 seconds; and again, the board 21 is rinsed as before.

Then the board 21 is subjected to chemical nickel plating in a chemical nickel plating bath at about 200° F.–210° F. to obtain the desired thickness of the nickel layer deposited thereon, the chemical nickel plating bath having a plating rate of about 0.9 to 1.0 mil/hour.

Preferably the nickel layer has a thickness in the general range 0.25 to 0.50 mil; whereby the immersion time in the chemical nickel plating bath is approximately 15 to 30 minutes.

The most suitable chemical nickel plating bath comprises an aqueous solution and may have the approximate composition:

| | M. p. l. |
|---|---|
| Nickel sulfate | 0.09 |
| Sodium hypophosphite | 0.225 |
| Malic acid | 0.18 |
| Sodium succinate | 0.06 |

Prior to use, the pH of this bath should be adjusted in the approximate range 5.8 to 6.0 employing sulfuric acid or sodium hydroxide, as required.

Another suitable chemical nickel plating bath comprises an aqueous solution and may have the approximate composition:

| | M. p. l. |
|---|---|
| Nickel sulfate | 0.07 |
| Sodium hypophosphite | 0.23 |
| Lactic acid | 0.30 |
| Propionic acid | 0.03 |

Prior to use, the pH of this bath should be adjusted in the approximate range 4.5 to 4.7 employing sulfuric acid or sodium hydroxide, as required.

While either of the two above-described chemical nickel plating baths are entirely satisfactory for the chemical nickel plating of the prepared surfaces of the board 21, the malic-succinate bath first described is preferred, since the adhesion of the nickel deposit is considerably greater employing this bath.

The above-described process of chemical nickel plating upon the surface of a non-metallic body is covered by U. S. Patent Nos. 2,690,401 and 2,690,402, granted on September 28, 1954, respectively to Gregoire Gutzeit, William J. Crehan and Abraham Krieg, and to William J. Crehan.

After the last-mentioned chemical nickel plating step, the board 21 is removed to an oven and heat-treated at a temperature of about 325° F. for a time interval of about 30 minutes in order to effect thorough drying and degassing thereof; whereby the finished printed electric circuit 20 of Figs. 5 and 6 is produced.

In the printed electric circuit 20, the previously prepared surfaces of the board 21 carry, as shown in Figs. 5 and 6, the layers of nickel 24 and 25 that have been chemically plated thereupon, the layer 24 being disposed upon the front surface of the board 21 and the layers 25 being respectively disposed upon the surfaces of the board 21 surrounding the holes 22 therein, the layers 24 and 25 being integral and intimately bonded to the prepared surfaces mentioned of the board 21.

More particularly, the nickel layer 24 is arranged in the bottom of the elongated channels formed in the insulating masking layer 23 and covers the unmasked primary areas of the front surface of the board 21 thereby defining the resistor R and the capacitor C and the upper portions of the terminals T1 and T2, the lower or shank portions of the terminals T1 and T2 being formed by the respective joining nickel layers 25. Moreover, the thickness of the nickel layer 24 is substantially less than that of the insulating masking layer 23, as best illustrated in Fig. 6.

In the foregoing description of the deposited layers 24 and 25, reference has been made to these layers as being formed of nickel; whereas, in fact, they comprise nickel and phosphorus, containing about 6 to 12% phosphorus by weight. In other words, the chemical nickel plating process described above inherently results in the plating upon the prepared surfaces of the layers 24 and 25 that comprise an amorphous solid material including about 88 to 94% nickel and 6 to 12% phosphorus by weight.

In conjunction with the construction of the printed electric circuit 20, as shown in Figs. 5 and 6, it will be understood that any circuit elements that are required upon the rear surface of the insulating board 21 are formed thereon simultaneously with the formation of the circuit element R and C on the front surface of the insulating board 21, as described above, and that any interconnections required between the circuit elements respectively carried upon the front and rear surfaces of the insulating board 21 are accomplished through the terminals T1, T2, etc.; whereby the interconnected circuit element carried on the respective surfaces of the insulating board 21 are integrally united by the terminals T1 and T2, etc. Moreover, it will be appreciated that the production of the required insulating masking layer on the rear surface of the insulating board 21 may be made either simultaneously with the production of the insulating masking layer 23 upon the front surface of the insulating board 21 or as a sequential step, in the manner described above. In other words, it is only the production of the circuit elements respectively carried by the opposite sides of the insulating board 21 and the interconnecting terminals that should be produced simultaneously so as to obtain the integral and one-piece structure previously described.

Recapitulating, the entire front surface of the board 21, together with the surfaces thereof, surrounding the holes 22 are prepared by roughening and cleaning so as to freshen the same; and thereafter, upon immersion of the board 21 in the aqueous palladium chloride solution minute quantities of palladium chloride adhere to the prepared surfaces mentioned. Thereafter, when the board 21 is immersed in the aqueous chemical reducing solution, these minute quantities of palladium chloride are reduced to metallic palladium so as to provide dispersed minute metallic palladium particles secured to the freshened surfaces mentioned, whereby the surfaces mentioned are activated. Next, the insulating masking layer 23 is applied to the front surface of the board 21 in order to mask the secondary areas thereof and to leave unmasked the primary areas thereof so as to define the pattern of the electric circuit; whereby the insulating masking layer 23 protects the activated secondary areas of the front surface of the board 21 against subsequent nickel plating. Subsequently, upon immersion of the board 21 into the aqueous chemical nickel strike bath, a nickel strike takes place upon the palladium particles noted carried by the activated primary areas of the front surface of the board 21, as well as upon the palladium particles carried by the activated surfaces of the board 21 surrounding the holes 22; and still subsequently upon immersion of the board 21 into the aqueous chemical nickel plating bath, nickel-phosphorous plating takes place upon these nickel plated palladium particles, which serve as growth nuclei, so that the thin continuous integral nickel-phosphorus layers 24 and 25 are produced upon the freshened and activated exposed surfaces mentioned of the board 21; which integral layers 24 and 25 are intimately and tenaciously bonded to the underlying surfaces mentioned.

In the foregoing description of the method of making the printed electric circuit 20 of Figs. 5 and 6, it was explained that after the front of the insulating board 21 is treated to provide the freshened surface thereon, that it is activated by securing thereto the minute metallic palladium particles, and that the masking layer 23 is applied so as to mask the secondary areas of the activated front surface of the board 21 and so as to leave exposed only the activated primary areas of the front surface of the board 21; and while this is the preferred arrangement of the steps of the method, this precise order thereof is not altogether critical. For example, as an alternative procedure, the masking and activating steps described above may be reversed in the overall method. Specifically, after the front of the insulating board 21 is treated to provide the freshened surface thereon, the insulating masking layer 23 may be applied to the front surface of the insulating board 21, followed by the activation of the exposed unmasked primary areas only of the front surface of the insulating board 21 together with the surfaces thereof surrounding the holes 22 provided therethrough. While this arrangement is somewhat more economical with reference to the utilization of the palladium chloride solution, it requires an additional step in that there is a small tendency for the surface of the insulating masking layer 23 to be activated; whereby the additional step mentioned involves brushing of the front surface of the insulating masking layer 23 following the activation step as previously described. As noted above, this possible activiation of the surface of the insulating masking layer 23 is really only a tendency since the surface thereof is hard and smooth, as contracted with the freshened surface of the insulating board 21 that is exposed and unmasked. This explanation is offered so that it will be appreciated how the exposed rough surface of the insulating board 21 may be readily activated, without activating the smooth surface of the insulating masking layer 23, since both of these elements are normally formed of phenol-formaldehyde condensation products.

Referring now to Figs. 7 and 8, a modified form of the printed electric circuit 30 is illustrated that is especially designed to achieve complete potting of the circuit elements thereof and that may be produced directly from the printed electric circuit 20 of Figs. 5 and 6 by further processing thereof. Specifically, to the printed electric circuit 20, insulating strips 31 are applied to insulating strips 31 being disposed in the top of the channels formed in the insulating masking layer 23 and on top of the resistor R, the capacitor C and the upper portions of the terminals T1 and T2. Preferably, the insulating strips 31 comprise a layer of synthetic organic thermosetting resin, or the like, that has a thickness, which combined with the thickness of the nickel layer 24, fills up the channels formed in the insulating masking layer 23 so as to provide a composite smooth upper surface upon the insulating board 21. Specifically, the insulating strips 31 may comprise another layer of the lacquer of which the insulating masking layer 23 is formed. In this case, the additional layer of lacquer is laid into the top of the channels formed in the insulating masking layer 23 and on top of the nickel layer 24 in any suitable manner. Thereafter the board 21 is transferred to an oven and subjected to heat-treatment at a temperature of about 325° F. for a time interval of above 30 minutes in order to react the ingredients of the lacquer so as to produce the thermoset resin or composition.

In this curing of the insulating strips or layer 31, the lower surface thereof is intimately bonded to the nickel layer 24 and the side edges thereof are intimately bonded to the insulating masking layer 23 at the side walls of the channels formed therein; whereby the insulating board 21, the insulating masking layer 23 and the insulating layer 31 cooperate completely to pot the circuit elements R and C. In passing, it is noted that incident to the application of the lacquer comprising the insulating layer 31 and in the subsequent curing thereof suitable removable plugs, not shown, may be inserted into the hollow barrels of the nickel layers 25 so that in the production of the insulating layer 31 the hollow terminals T1 and T2 are not plugged.

This form of the printed electric circuit 30, shown in Figs. 7 and 8, is very advantageous in view of the fact that the circuit elements R and C are completely potted, thereby sealing the same against contact by air and moisture, since the elements 21, 23 and 26 formed of insulating material are impervious to air and moisture and are sealed together. Moreover, the arrangement offers other advantages with respect to the positive prevention of dislocation of the fixed positions of the circuit elements; which is most important in conjunction with maintaining predetermined inductance, capacitance and other electrical characteristics, particularly when circuit elements are involved that are disposed upon opposite sides of the insulating base 21. In other words, the capacitance between two elements disposed upon opposite sides of the insulating base 21 is dependent, among other factors, upon the spacing therebetween; whereby the potting of the circuit elements positively prevents in use any variation with respect to the spacings mentioned. Furthermore, the arrangement insures that in the final printed electric circuit 30, as shown in Figs. 7 and 8, all of the exterior surfaces are smooth and of insulating material, whereby the finished printed electric circuit 30 may be stacked conveniently, with other such printed electric circuits, to form a compact arrangement of the entire electrical components of the ultimate electric circuit arrangement.

In conjunction with the construction of the printed electric circuit 30, as shown in Figs. 7 and 8, it will be understood that in the event circuit elements are provided on the rear surface of the insulating board 21, then corresponding insulating strips are provided on the rear surface of the insulating board 21, and disposed in the top of the channels formed in the corresponding insulating masking layer and on top of the corresponding circuit elements; whereby the circuit elements provided on the rear surface of the insulating board 21 are completely potted in the manner of the circuit elements provided on the front surface of the insulating board 21, as described above. The matter of the production of the required insulating strips or layer on the rear surface of the insulating board 21 may be made either simultaneously with that of the insulating strips or layer 31 upon the front surface of the insulating board 21, or as a sequential step, in the manner described above. Thus, in this event, the circuit elements respectively provided on the front and rear surfaces of the insulating board 21 are completely potted to protect them against contact by air and moisture.

Referring now to Figs. 9 and 10, another modified form of the printed electric circuit 40 is illustrated that is especially designed to carry substantial electric currents and that may be produced directly from the printed electric circuit 20 of Figs. 5 and 6 by further processing thereof. Specifically, to the printed electric circuit 20, layers of copper 41 and 42 are electrodeposited, the layer 41 being disposed upon the nickel-phosphorus layer 24 and the copper layer 42 being disposed upon the nickel-phosphorus layer 25, the layers 41 and 42 being integral with each other and intimately bonded to the respective layers 24 and 25. This arrangement is advantageous when the circuit element of the printed electric circuit 40 are required to carry substantial current, since the copper layer 41—42 has a substantially lower specific resistance than the nickel-phosphorus layer 24—25. More particularly, the specific resistance of the copper layer 41—42 is about $1.72 \times 10^{-6}$ ohm per cm.$^3$, whereas the specific resistance of the nickel-phosphorus layer 24—25 is about $60 \times 10^{-6}$ ohm per cm.$^3$.

As a matter of production, the printed electric circuit 40 of Figs. 9 and 10 may be made directly from the printed electric circuit 20 of Figs. 5 and 6 employing certain steps involving the electrodeposition of the copper layer 41—42. Specifically, the exposed surfaces of the nickel-phosphorus layer 24—25 are cleaned and lightly pickled with a suitable acid, such as hydrochloric acid, and then transferred to conventional electroplating equipment, including a copper electrode, and subjected to electroplating operations, the insulating board 21 being immersed in an appropriate copper electroplating bath. Specifically, the nickel-phosphorus layer 24—25 is first subjected to a reverse current for about 30 to 60 seconds, in order to activate the same, the nickel-phosphorus layer constituting the anode and the copper electrode constituting the cathode. After this activation, the nickel-phosphorus layer 24—25 is subjected to a forward current in a conventional manner, the nickel-phosphorus layer 24—25 constituting the cathode and the copper electrode constituting the anode. In this copper plating step the insulating masking layer 23 positively defines the configuration of the copper layer 41—42 to that of the nickel-phosphorus layer 24—25; whereby the composite circuit elements have the desired configuration in the finished printed electric circuit 40.

While a standard cyanide electroplating bath may be employed, the electroplating bath set forth below is even more advantageous in view of the circumstance that it is productive of a copper layer that is very tenaciously bonded to the nickel-phosphorus layer, as more fully explained hereinafter, the electroplating bath mentioned comprising an aqueous solution and having the approximate composition:

| | | |
|---|---|---|
| $CU(SO_4) \cdot 5H_2O$ | gm./l. | 188 |
| $H_2SO_4$ conc. (66° Bé.) | cc./l. | 61.5 |
| Thiourea | gm./l. | 0.01 |
| Black strap molasses | gm./l. | 0.8 |
| Petrowet R (Du Pont) | p. p. m. | 25 |

In passing, it is noted that after preparation of the electroplating bath mentioned, it should be filtered in order to remove therefrom any sediment; and also it is mentioned that "Petrowet R" is a wetting agent manufactured by Du Pont, and that other equivalent wetting agents may be employed.

In the electroplating step, a current density of about 20–70 amps./sq. ft. (0.7–2 v.) may be employed with constant agitation of the electroplating bath. The electroplating step is carried out for a suitable time interval in order to provide the copper layer 41—42 of the required thickness, and thereafter the board 21 is removed from the electroplating bath and rinsed with tap water and again transferred to an oven and subjected to heat-treatment for a time interval of about 30-minutes in order to effect thorough drying and degassing thereof; whereby the finished printed electric circuit 40 of Figs. 5 and 6 is produced.

Also, it will be understood that in the electroplating of the copper layer 41—42 any circuit elements that may be carried by the rear surface of the insulating board 21 will be electroplated; whereby the copper layer thus produced is integral and of one-piece, the portions thereof disposed on the opposite surfaces of the insulating board 21 being integrally joined by the portions 42 thereof extending through the terminals T1, T2, etc.

In the printed electric circuit 40, the combined thicknesses of the nickel-phosphorus layer 24—25 and the copper layer 41—42 are not ordinarily as great as that of the insulating masking layer 23; whereby the printed electric circuit 40 of Figs. 9 and 10 may be processed in order completely to pot the circuit elements, if desired, as described in conjunction with the printed electric circuit 3 of Figs. 7 and 8.

In view of the foregoing it is apparent that there has been provided an improved method of making a printed electric circuit that may be readily carried out in a simple and economical manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of making a printed electric circuit, which comprises providing a composite board carrying upon the face thereof a layer having a channel formed therein, said layer having a thickness substantially less than that of said board and said channel having a depth commensurate with the thickness of said layer so that only the portion of the face of said board constituting the bottom of said channel is exposed, both said board and said layer being formed of electrical insulating synthetic plastic material, said exposed portion of the face of said board constituting the bottom of said channel also carrying dispersed growth nuclei minute particles that are catalytic to a plating bath of the nickel cation-hypophosphite anion type, and immersing said composite board in a plating bath of the nickel cation-hypophosphite anion type for a sufficiently long time interval to effect chemical nickel plating of an electrical conductive circuit element upon the face of said board and in the bottom of said channel and having a thickness less than that of said layer, whereby said circuit element is completely channelized by said layer and comprises about 88 to 94% nickel and 6 to 12% phosphorus by weight.

2. The method of making a printed electric circuit, which comprises providing an electrical insulating board, applying a layer of electrical insulating synthetic plastic material upon the face of said board and into intimate bonded relation therewith and so that a channel of predetermined configuration is formed in said layer and so that said layer has a thickness substantially less than that of said board and so that said channel has a depth commensurate with the thickness of said layer, and applying by chemical desposition from a plating bath of the nickel cation-hypophosphite anion type an electrical conducting nickel-phosphorus alloy circuit element in the bottom of said channel and upon the face of said board and into intimate bonded relation therewith and so that the configuration of said circuit element is defined by said channel and comprises said predetermined configuration and so that said circuit element has a thickness somewhat less than that of said layer in order that said circuit element is completely channelized by said layer.

3. The method set forth in claim 2, wherein said alloy comprises about 88% to 94% nickel and 6% to 12% phosphorus by weight.

4. The method of making a printed electric circuit, which comprises providing an electrical insulating board, applying a layer of electrical insulating thermosetting synthetic plastic material upon the face of said board and into intimate bonded relation therewith and so that a channel of predetermined configuration is formed in said layer and so that said layer has a thickness substantially less than that of said board and so that said channel has a depth commensurate with the thickness of said layer, heating said layer in order to set the material thereof, and applying by chemical deposition from a plating bath of the nickel cation-hypophosphite anion type an electrical conducting nickel-phosphorus alloy circuit element in the bottom of said channel and upon the face of said board and into intimate bonded relation therewith and so that the configuration of said circuit element is defined by said channel and comprises said predetermined configuration and so that said circuit element has a thickness somewhat less than that of said layer in order that said circuit element is completely channelized by said layer.

5. The method of making a printed electric circuit, which comprises providing an electrical insulating board, applying a layer of electrical insulating synthetic plastic material upon the face of said board and into intimate bonded relation therewith and so that a channel of predetermined configuration is formed in said layer and so that said layer has a thickness substantially less than that of said board and so that said channel has a depth commensurate with the thickness of said layer, applying by chemical deposition from a plating bath of the nickel cation-hypophosphite anion type an electrical conducting nickel-phosphorus alloy circuit element in the bottom of said channel and upon the face of said board and into intimate bonded relation therewith and so that the configuration of said circuit element is defined by said channel and comprises said predetermined configuration and so that said circuit element has a thickness somewhat less than that of said layer, applying a strip of electrical insulating synthetic plastic material in the top of said channel and upon the top of said circuit element and into intimate bonded relation therewith and so that the configuration of said strip is defined by said channel and comprises said predetermined configuration, wherein the combined thicknesses of said circuit element and said strip are substantially the same as that of said layer in order that both said circuit element and said strip are completely channelized by said layer, and wherein the side edges of said strip are also in intimate bonded relation with said layer at the side walls of said channel in order that said board and said layer and said strip cooperate completely to pot said circuit element.

6. The method of making a printed electric circuit, which comprises providing an electrical insulating board, activating the face of said board by securing thereto dispersed growth nuclei minute particles that are catalytic to a plating bath of the nickel cation-hypophosphite anion type, applying a masking layer of electrical insulating synthetic plastic material upon the face of said board and into intimate bonded relation therewith and so that a channel of predetermined configuration is formed in said masking layer and so that said masking layer has a thickness substantially less than that of said board and so that said channel has a depth commensurate with the thickness of said masking layer in order that only the portion of the activated face of said board in the bottom of said channel is exposed, and contacting said board and said masking layer with a plating bath of the nickel cation-hypophosphite anion type in order to effect selective chemical deposition of an electrical conducting nickel-phosphorus alloy circuit element upon the exposed activated portion of the face of said board in the bottom of said channel and into intimate bonded relation therewith and so that the configuration of said circuit element is defined by said channel and comprises said predetermined configuration and so that said circuit element has a thickness somewhat less than that of said masking layer in order that said circuit element is completely channelized by said masking layer.

7. The method of making a printed electric circuit, which comprises providing an electrical insulating base, activating the surface of said base by securing thereto dispersed growth nuclei minute particles that are catalytic to a plating bath of the nickel cation-hypophosphite anion type, applying to the activated surface of said base a masking layer of electrical insulating thermosetting synthetic plastic material and related to the pattern of the electric circuit desired such that first unmasked areas of the activated surface of said base define the areas upon which electrical conducting circuit elements are desired and such that second masked areas of the activated surface of said base define the areas upon which no electrical conducting circuit elements are desired, heating said base and said masking layer in order to set the material of said masking layer, and contacting said base and said masking layer with a plating bath of the nickel cation-hypophosphite anion type in order to effect selective chemical deposition of the electrical conducting circuit elements of the electric circuit desired upon the activated unmasked first areas of the surface of said base, said circuit elements comprising about 88% to 94% nickel and 6% to 12% phosphorus by weight.

8. The method of making a printed electric circuit, which comprises providing an electrical insulating base, exposing a freshened surface on said base, securing to the freshened surface of said base dispersed growth nuclei minute particles that are catalytic to a plating bath of the nickel cation-hypophosphite anion type, applying to the freshened surface of said base a masking layer of electrical insulating synthetic plastic material and related to the pattern of the electric circuit desired such that first unmasked areas of the freshened surface of said base define the areas upon which electrical conducting circuit elements are desired and such that second masked areas of the freshened surface of such base define the areas upon which no electrical conducting circuit elements are desired, and contacting said base and said masking layer with a plating bath of the nickel cation-hypophosphite anion type in order to effect selective chemical plating upon said particles and subsequent growth of the plating into coatings upon the first areas of the freshened surface of said base, said coatings constituting the electrical conducting circuit elements of the electric circuit desired and comprising about 88% to 94% nickel and 6% to 12% phosphorus by weight.

9. The method of making a printed electric circuit, which comprises providing an electrical insulating base, exposing a freshened surface on said base, contacting said base with a first aqueous solution of a palladium salt, then contacting said base with a second aqueous solution of a chemical reducing agent in order to effect the chemical reduction of said palladium salt to metallic palladium so that dispersed minute metallic palladium particles are secured to the freshened surface of said base, applying to the freshened surface of said base a masking layer of electrical insulating synthetic plastic material and related to the pattern of the electric circuit desired such that first unmasked areas of the freshened surface of said base define the areas upon which electrical conducting circuit elements are desired and such that second masked areas of the freshened surface of said base define the areas upon which no electrical conducting circuit elements are desired, and contacting said base and said masking layer with a plating bath of the nickel cation-hypophosphite anion type in order to effect selective chemical plating upon said particles and subsequent growth of the plating into coatings upon the first areas of the freshened surface of said base, said coatings constituting the electrical conducting circuit elements of the electric circuit desired and comprising about 88% to 94% nickel and 6% to 12% phosphorus by weight.

10. The method of making a printed electric circuit, which comprises providing an electrical insulating board, applying a masking layer of electrical insulating synthetic plastic material upon the face of said board and into intimate bonded relation therewith and so that an elongated channel of predetermined configuration is formed in said masking layer and so that said masking layer has a thickness substantially less than that of said board and so that said channel has a depth commensurate with the thickness of said masking layer in order that only the portion of the face of said board in the bottom of said channel is exposed, activating the portion of the face of said board that is exposed in the bottom of said channel by securing thereto dispersed growth nuclei minute particles that are catalytic to a plating bath of the nickel cation-hypophosphite anion type, and contacting said board and said masking layer with a plating bath of the nickel cation-hypophosphite anion type in order to effect selective chemical deposition of an electrical conducting circuit element upon the activated portion of the face of said board and into the bottom of said channel and so that the configuration of said circuit element is defined by said channel and comprises said predetermined configuration and so that said circuit element has a thickness somewhat less than that of said masking layer in order that said circuit element is completely channelized by said masking layer, said circuit element comprising about 88% to 94% nickel and 6% to 12% phosphorus by weight.

11. The method of making a printed electric circuit, which comprises providing an electrical insulating base, applying to the surface of said base a masking layer of electrical insulating thermosetting synthetic plastic material and related to the pattern of the electric circuit desired such that first unmasked areas of the surface of said base define the areas upon which electrical conducting circuit elements are desired and such that second masked areas of the surface of said base define the areas upon which no electrical conducting circuit elements are desired, heating said base and said masking layer in order to set the material of said masking layer, activating the first areas of the surface of said base by securing thereto dispersed growth nuclei minute particles that are catalytic to a plating bath of the nickel cation-hypophosphite anion type, and contacting said base and said masking layer with a plating bath of the nickel cation-hypophosphite anion type in order to effect selective chemical deposition of the electrical conducting circuit elements of the electric circuit desired upon the activated unmasked first areas of the surface of said base, said circuit elements comprising about 88% to 94% nickel and 6% to 12% phosphorus by weight.

12. The method of making a printed electric circuit, which comprises providing an electrical insulating base, exposing a freshened surface on said base, applying to the freshened surface of said base a masking layer of electrical insulating synthetic plastic material and related to the pattern of the electric circuit desired such that first unmasked areas of the freshened surface of said base define the areas upon which electrical conducting circuit elements are desired and such that second masked areas of the surface of said base define the areas upon which no electrical conducting circuit elements are desired, securing to the first areas of the freshened surface of said base dispersed growth nuclei minute particles that are catalytic to a plating bath of the nickel cation-hypophosphite anion type, and contacting said base and said masking layer with a plating bath of the nickel cation-hypophosphite anion type in order to effect chemical plating upon said particles and subsequent growth of the plating into coatings upon the first areas of the freshened surface of said base, said coatings constituting the electrical conducting circuit elements of the electric circuit desired and comprising about 88% to 94% nickel and 6% to 12% phosphorus by weight.

13. The method of making a printed electric circuit, which comprises providing an electrical insulating base, exposing a freshened surface on said base, applying to the freshened surface of said base a masking layer of electrical insulating synthetic plastic material and related to the pattern of the electric circuit desired such that first unmasked areas of the freshened surface of said base define the areas upon which electrical conducting circuit elements are desired and such that second masked areas of the freshened surface of said base define the areas upon which no electrical conducting circuit elements are desired, contacting said base and said masking layer with a first aqueous solution of a palladium salt, then contacting said base and said masking layer with a second aqueous solution of a chemical reducing agent in order to effect the chemical reduction of said palladium salt to metallic palladium so that dispersed minute metallic palladium particles are secured to the first areas of the freshened surface of said base, and contacting said base and said masking layer with a plating bath of the nickle cation-hypophosphite anion type in order to effect selective chemical plating upon said particles and subsequent growth of the plating into coatings upon the first areas of the freshened surface of said base, said coatings constituting the electrical conducting circuit elements of the electric circuit desired and comprising about 88% to 94% nickel and 6% to 12% phosphorus by weight.

References Cited in the file of this patent

UNITED STATES PATENTS

| | | |
|---|---|---|
| 504,543 | Suess | June 24, 1893 |
| 919,078 | Ribbe | Apr. 20, 1909 |
| 1,638,943 | Little | Aug. 16, 1927 |
| 1,656,265 | Cosner | Jan. 17, 1928 |
| 1,767,715 | Stoekle | June 24, 1930 |
| 1,899,068 | Walsh et al. | Feb. 28, 1933 |
| 2,474,988 | Sargrove | July 5, 1949 |
| 2,599,710 | Hathaway | June 10, 1952 |
| 2,626,206 | Adler et al. | Jan. 20, 1953 |
| 2,690,401 | Gutzeit et al. | Sept. 28, 1954 |
| 2,690,402 | Grehan | Sept. 28, 1954 |
| 2,690,403 | Gutzeit et al. | Sept. 28, 1954 |
| 2,721,152 | Hope et al. | Oct. 18, 1955 |

OTHER REFERENCES

Wein: Metallizing Non-Conductors, 1945 pp. 58–59, 117–35.